(12) United States Patent
Kressner et al.

(10) Patent No.: US 7,792,613 B2
(45) Date of Patent: Sep. 7, 2010

(54) HYBRID VEHICLE RECHARGING SYSTEM AND METHOD OF OPERATION

(75) Inventors: A. Arthur Kressner, Westfield, NJ (US); Christopher C. Hoyes, West New York, NJ (US); Anthony F. Barna, North Massapequa, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 0 days.

(21) Appl. No.: 12/569,348

(22) Filed: Sep. 29, 2009

(65) Prior Publication Data
US 2010/0017044 A1 Jan. 21, 2010

Related U.S. Application Data

(62) Division of application No. 11/850,113, filed on Sep. 5, 2007.

(51) Int. Cl.
*G05D 3/12* (2006.01)
*G05B 11/01* (2006.01)
*H02J 7/00* (2006.01)
*G01R 11/56* (2006.01)

(52) U.S. Cl. ............ 700/296; 700/14; 700/16; 700/286; 700/291; 320/104; 320/109; 705/412; 903/903

(58) Field of Classification Search ............ 700/14, 700/16, 22, 286, 291, 295, 297, 296; 705/63, 705/412; 320/104, 109; 903/903, 904, 907
See application file for complete search history.

(56) References Cited

U.S. PATENT DOCUMENTS

| | | | |
|---|---|---|---|
| 5,297,664 A | 3/1994 | Tseng et al. | |
| 5,819,234 A | 10/1998 | Slavin et al. | |
| 6,058,312 A | 5/2000 | Kimura | |
| 6,437,692 B1 | 8/2002 | Petite et al. | |
| 6,614,204 B2 | 9/2003 | Pellegrino et al. | |
| 6,771,044 B1 | 8/2004 | Vinciguerra et al. | |
| 6,900,556 B2 * | 5/2005 | Provanzana et al. | 307/19 |
| 6,945,453 B1 | 9/2005 | Schwarz Jr. | |
| 7,013,205 B1 | 3/2006 | Hafner et al. | |
| 7,053,767 B2 | 5/2006 | Petite et al. | |
| 7,274,975 B2 | 9/2007 | Miller | |
| 7,402,978 B2 * | 7/2008 | Pryor | 320/104 |
| 7,468,661 B2 | 12/2008 | Petite et al. | |

(Continued)

OTHER PUBLICATIONS

Fanney et al., "The Thermal Performance of Residential Electric Water Heaters Subjected to Various Off-Peak Schedules," Journal of Solar Energy Engineering, vol. 118, pp. 73-80, May 1996, 8 pages.

(Continued)

*Primary Examiner*—Sean P Shechtman
(74) *Attorney, Agent, or Firm*—Cantor Colburn LLP

(57) ABSTRACT

A system and method for recharging a plug-in hybrid vehicle. The system includes a controller that schedules the recharging of the vehicles on local electrical distribution networks. The system arranges the schedule to minimize the demand loading on the local distribution network to more efficiently operate power plants providing electrical power to the distribution networks. A system for collecting charges associated with the recharging of plug-in hybrid vehicles is also disclosed providing for prepaid utility accounts.

5 Claims, 13 Drawing Sheets

U.S. PATENT DOCUMENTS

| | | | |
|---|---|---|---|
| 7,590,472 | B2 | 9/2009 | Hakim et al. |
| 7,679,336 | B2 | 3/2010 | Gale et al. |
| 2003/0221883 | A1 | 12/2003 | Kubodera et al. |
| 2004/0130292 | A1* | 7/2004 | Buchanan et al. ........... 320/116 |
| 2006/0052918 | A1 | 3/2006 | McLeod et al. |
| 2006/0278449 | A1 | 12/2006 | Torre-Bueno |
| 2007/0271006 | A1 | 11/2007 | Golden et al. |
| 2008/0040295 | A1 | 2/2008 | Kaplan et al. |
| 2008/0052145 | A1 | 2/2008 | Kaplan et al. |
| 2008/0167756 | A1 | 7/2008 | Golden et al. |
| 2008/0281663 | A1 | 11/2008 | Hakim et al. |

OTHER PUBLICATIONS

International Search Report, International Application No. PCT/US 08/74399, mailed Oct. 31, 2008, 10 pages.

W. Kempton et al., "Vehicle-to-grid power fundamentals: Calculating capacity and net revenue", Journal of Power Sources, University of Delaware, Dec. 8, 2004, http://www.udel.edu/V2G/KempTom-V2G-Fundamentals05.PDF, retrieved Nov. 13, 2008, 12 pages.

Oi et al., "Feasibility study on hydrogen refueling infrastructure for fuel cell vehicles using the off-peak power in Japan," International Journal of Hydrogen Energy 29 (2004) 347-354, Institute of Hydrogen Energy, Jun. 2, 2003, 8 pages.

P. Denholm & W. Short, "An Evaluation of Utility System Impacts and Benefits of Optimally Dispatched Plug-In Hybrid Electric Vehicles", technical report, Oct. 2006, 30 pages, National Renewable Energy Laboratory, U.S. Department of Energy Office of Energy Efficiency & Renewable Energy, Golden, CO, US.

W. Kempton et al., "Vehicle-to-Grid Power: Battery, Hybrid, and Fuel Cell Vehicles as Resources for Distributed Electric Power in California", Report prepared for the California Air Resources Board and the California Environmental Protection Agency and the Los Angeles Department of Water and Power, Electric Transportation Program, Jun. 2001, http://www.udel.edu/V2G/docs/V2G-Cal-2001.pdf, retrieved Nov. 13, 2008, 94 pages.

International Preliminary Report on Patentability for International Patent Application PCT/US2008/074399, mailed Mar. 18, 2010, 8 pages.

* cited by examiner

HYBRID VEHICLE RECHARGING SYSTEM AND METHOD OF OPERATION

CROSS-REFERENCE TO RELATED APPLICATIONS

This is a divisional application of U.S. patent application Ser. No. 11/850,113, entitled "Hybrid Vehicle Recharging System and Method of Operation" filed Sep. 5, 2007, which is hereby incorporated by reference in its entirety.

BACKGROUND OF THE INVENTION

The present invention relates generally to a system for recharging plug-in hybrid vehicles and more particularly to a system that balances the electrical power demands on local distribution networks.

Due to rising cost of petroleum and the fuels derived from it, the desire to improve efficiency to reduce air pollutants and increasingly more restrictive regulatory requirements, the automotive industry has developed new types of vehicles that utilize a combination of power sources to provide the necessary energy to provide propulsion for the vehicle. Rather than rely solely on an internal combustion engine, these new vehicles, referred to as hybrid vehicles, utilize an internal combustion engine in combination with an electric motor. Another version called a plug-in hybrid may also supplement the charging of the batteries from the electric grid or other sources. Depending on the mode of operation, the vehicle will use the combustion engine, the electric motor, or a combination thereof. By using the electric motor at various times, the combustion engine could be shut off, reducing the amount of gasoline or other fuel consumed using electricity to power the motor instead. The electric motor is powered by batteries that are periodically recharged through a combination of a generator coupled to the combustion engine, regenerative breaking technology and from the local utility grid or other external source of electricity. Regenerative breaking allows the capture of energy that would otherwise be dissipated through heat when the vehicle is slowed down or brought to a stop.

Hybrid vehicles provided many advantages over previously introduced all electric vehicles. The hybrid vehicle provided greater range and more flexibility for the operator. Since the all-electric vehicle needed to be charged periodically, and required several hours at a minimum to recharge, the operator needed to remain aware of the level of charge remaining in the batteries to ensure they were able to return to their charging station. Hybrid vehicles, in contrast, by having two different sources of propulsion do not carry the same risks due to the wide availability of fuels such as gasoline.

A typical hybrid vehicle uses a nickel metal hydride battery to store electrical charge. When run in pure electric mode, the hybrid vehicle can only operate for short distances, 2 km-32 km for example, before requiring the use of the gasoline engine. Since the gasoline engine recharges the batteries, at least in part, the vehicle manufacturers need to balance the amount of battery storage against fuel efficiency to provide a vehicle that meets the consumers performance expectations.

To further lower emissions and increase gas mileage, some manufacturers have developed so-called "plug-in" hybrid ("PIH") vehicles. The PIH vehicles include a receptacle that connects the batteries to a standard 110V or 220V household electrical outlet and allows the consumer to recharge the batteries using utility electric power rather than by burning gasoline or other fuel in a combustion engine. This allows the PIH vehicles to have a longer range in electric mode of operation since larger capacity batteries may be used, resulting in vehicle that uses less gasoline and thus lower emissions. While the PIH vehicle does place additional demands on the existing utility electrical distribution.

While existing electrical distribution systems are suitable for this new purpose, there remains a need for improvements, particularly regarding the control of recharging of PIH vehicles and the increased efficiencies that may be gained from existing utility electrical distribution networks.

SUMMARY OF THE INVENTION

A system for recharging a hybrid vehicle having a battery is disclosed. The system includes a meter having a power connection configured to electrically couple to the hybrid vehicle. A local electrical distribution network is electrically coupled to the meter. A controller associated with the local electrical distribution network and disposed in communication with the utility distribution network and the meter, said controller including a processor responsive to executable computer instructions for providing a signal to said meter to allow electrical power to flow to said battery.

In another embodiment a hybrid vehicle is disclosed. The hybrid vehicle includes an electric motor coupled to a battery. A receptacle configured to receive electrical power from an external energy source is also electrically coupled to the battery. A meter is electrically coupled to the battery and receptacle where the meter is configured to control the flow of electrical power between the receptacle and the battery.

A method for collecting fees or credits such as carbon credits for recharging a hybrid vehicle is also disclosed. The method includes providing a controller containing a plurality of utility accounts wherein each utility account is associated with a corresponding individual or business entity. A meter associated with a hybrid vehicle is communicating to determine if the hybrid vehicle is associated with one of the utility accounts. Electrical power consumption by the hybrid vehicle authorizing at a first tariff rate if the hybrid vehicle is associated with one of the utility accounts. Finally, the hybrid vehicle is assigned an approved recharge time period.

A method for recharging a plurality of hybrid vehicles connected to a local utility network is also disclosed. The method includes the step of determining a number of hybrid vehicles connected to the local electrical distribution network. The electrical power characteristics of the local electrical distribution network are determined along with an off-peak period based on an electrical demand profile for the local electrical distribution network. Recharge times are scheduled for each of the plurality of hybrid vehicles wherein the scheduling is based on a balancing of the electrical power characteristics such as a demand profile and the number of hybrid vehicles. The final step includes activating the recharging of each of the hybrid vehicles at predetermined times during the off-peak period.

A meter associated with a plug-in hybrid vehicle is also disclosed having an electrical measuring device and a communications device. A processor is electrically coupled to the electrical measuring device and the communications device. The processor is responsive to executable computer instructions for receiving schedule instructions through the communications device and the processor includes means for connecting and disconnecting electrical power

BRIEF DESCRIPTION OF THE DRAWINGS

Referring now to the drawings, which are meant to be exemplary and not limiting, and wherein like elements are numbered alike.

DETAILED DESCRIPTION

Figure 1:
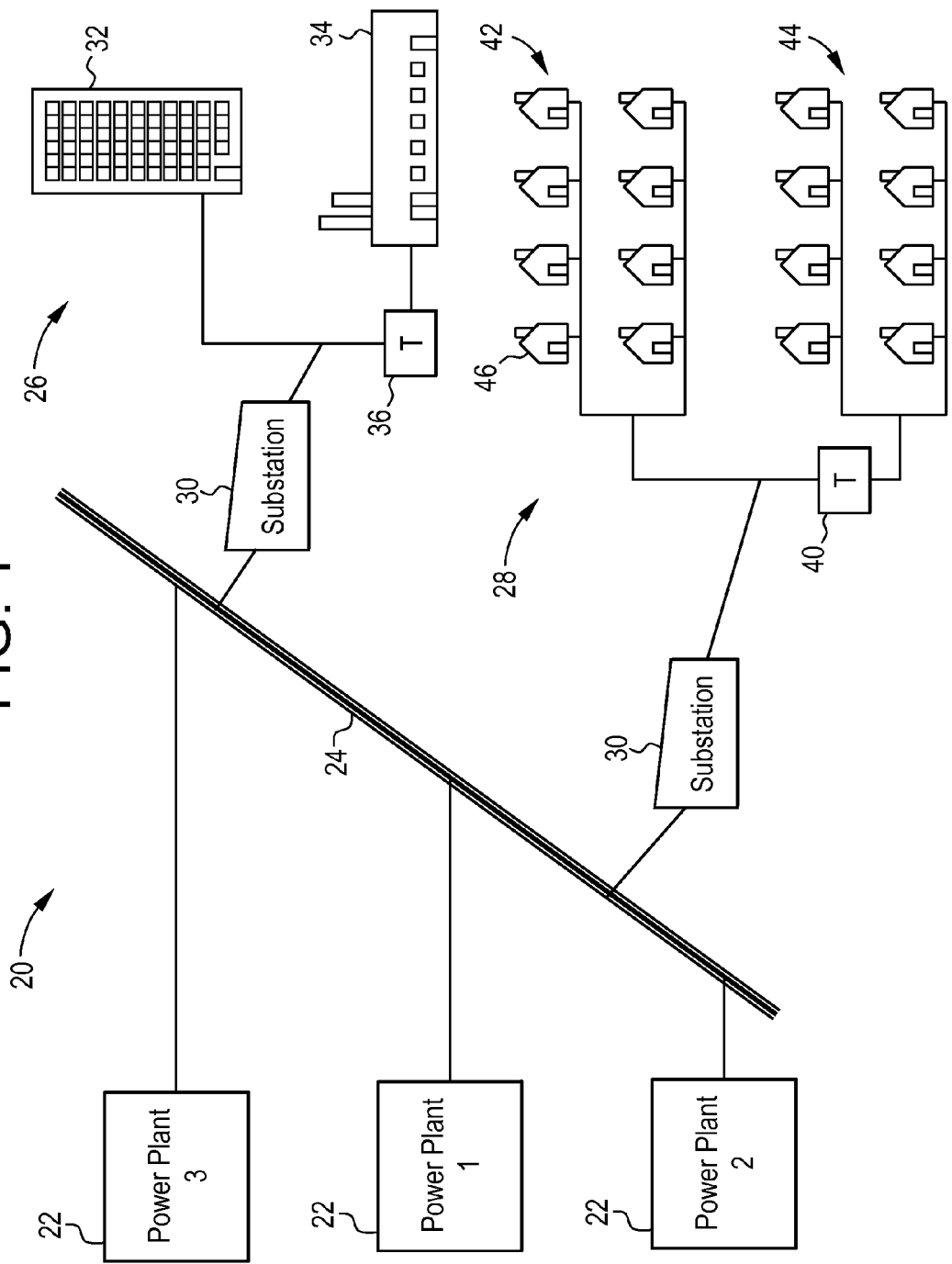
FIG. 1 is a schematic illustration of a utility electrical distribution system.

FIG. 1 illustrates an exemplary embodiment of a utility electrical distribution network 20. The utility network 20 includes one or more power plants 22 connected in parallel to a main distribution network 24. The power plants 22 may include, but are not limited to: coal, nuclear, natural gas, or incineration power plants. Additionally, the power plants 22 may include one or more hydroelectric, solar, or wind turbine power plants. It should be appreciated that additional components such as transformers, switchgear, fuses and the like (not shown) may be incorporated into the utility network 22 as needed to ensure the safe and efficient operation of the system. The utility network 20 may be interconnected with one or more other utility networks to allow the transfer of electrical power into or out of the electrical network 20.

The main distribution network 24 typically consists of medium voltage power lines, less than 50 kV for example, and associated distribution equipment which carry the electrical power from the point of production at the power plants 22 to the end users located on local electrical distribution networks 26, 28. The local distribution networks 26, 28 are connected to the main distribution network by substations 30 which adapt the electrical characteristics of the electrical power to those needed by the end users. Substations 30 typically contain one or more transformers, switching, protection and control equipment. Larger substations may also include circuit breakers to interrupt faults such as short circuits or over-load currents that may occur. Substations 30 may also include equipment such as fuses, surge protection, controls, meters, capacitors and voltage regulators.

The substations 30 connect to one or more local electrical distribution networks, such as local distribution network 26, for example, that provides electrical power to a commercial area having end users such as an office building 32 or a manufacturing facility 34. Local distribution network 26 may also include one or more transformers 36 which further adapt the electrical characteristics of the delivered electricity to the needs of the end users. Substation 30 may also connect with other types of local distribution networks such as residential distribution network 28. The residential distribution network 28 may include one or more residential buildings 46 and also light industrial or commercial operations.

The electrical power available to an end user on one of the local distribution networks 26, 28 will depend on the characteristics of local distribution network and where on the local network the end user is located. For example, local distribution network 28 may include one or more transformers 40 that further divides local distribution network 28 into two sub-networks 42, 44. One such electrical characteristic is the maximum power that may be delivered to a local distribution network. While the utility network 20 may have power plants 22 capable of generating many megawatts of electrical power, this power may not be completely available to an end user in a residence 46 on a local distribution network 28 since the intervening equipment and cabling restricts, or limits the delivery of electrical power.

Figure 2:
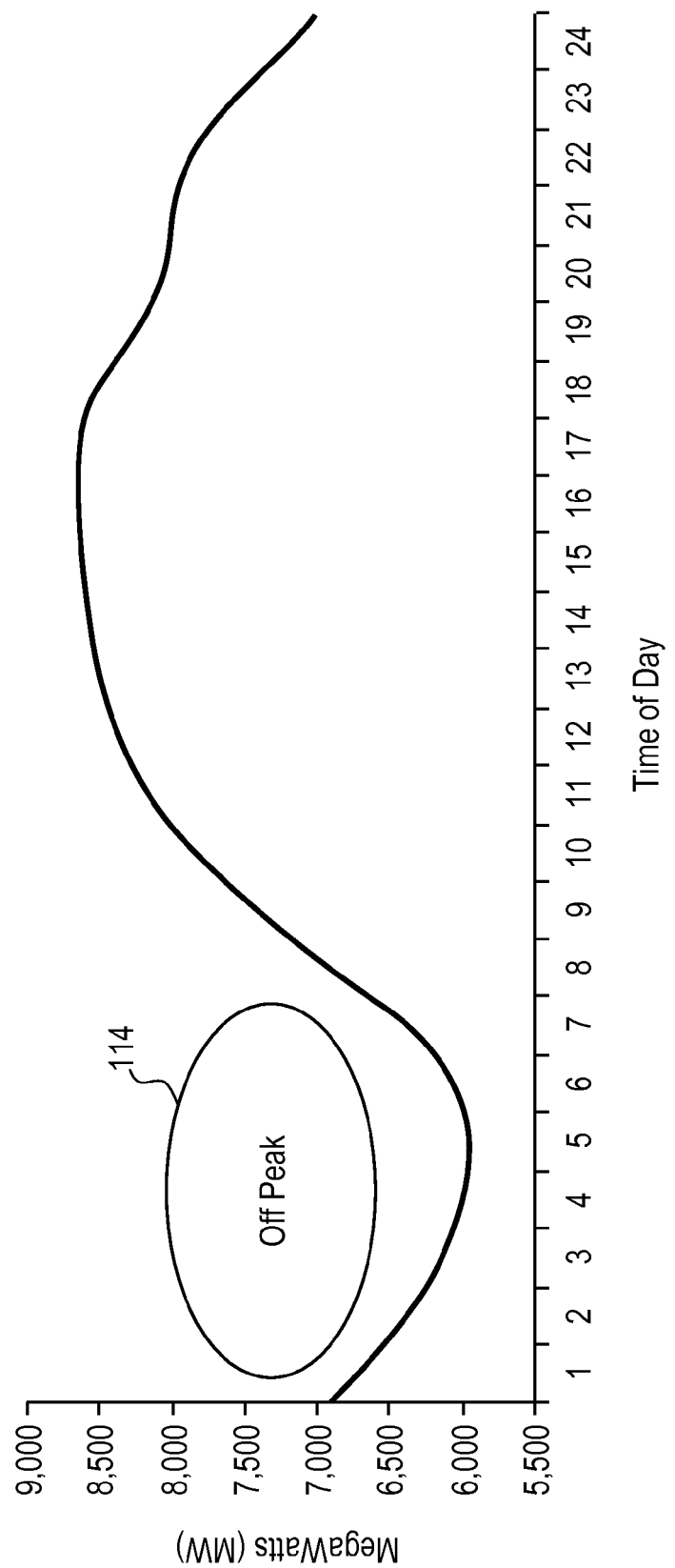
FIG. 2 is an illustration of an average electrical demand profile for electrical usage of a large metropolitan city having the electrical distribution network of FIG. 1.

Existing local distribution networks 26, 28 are designed to provide the electrical power demanded during peak usage periods. Referring to FIG. 2, it can be seen that the demand for electrical power does not remain constant during the day, but rather peaks in the late afternoon/early evening. The demand curve illustrated in FIG. 2 is an average electrical demand for a large metropolitan city. The actual demands on the local distribution network will change from one day to the next and will also differ depending on the season. The actual demand will be the function of many parameters, including the weather, time of day, season of the year and the like. Further if a local distribution network 26, 28 experiences an increase in electrical demand due to other factors, such as new construction for example, changes may need to be made to the local distribution network to allow sufficient power to flow to the local distribution network, even though the utility network 20 has sufficient electrical production capacity to meet the needs of the new demand.

PIH vehicles represent one such type of increase in electrical power demand on the utility network 20. It has been estimated that the existing utility networks have sufficient generation capacity such that PIH vehicles would need to achieve a market penetration of 30%-40% before additional capacity would need to be added. However, a lower market penetration as well as the higher market penetrations may result in power constraints on individual local distribution networks depending on a number of factors including the local distribution network power delivery capacity, the existing base load and the number of PIH vehicles on the local distribution network. The power constraints on a local distribution network such as residential network 28 for example, may be further complicated by the demographics of the network. In a residential network, the owners of PIH vehicles will be tend to arrive home from work in the late afternoon or early evening. When the owners arrive home, they will tend to connect their PIH vehicle to an electrical outlet during the same time frame. Without some type of control, the additional electrical demands from the PIH vehicles will be placed on the local distribution network at the time of day which also corresponds to the peak demand period.

Figure 3:
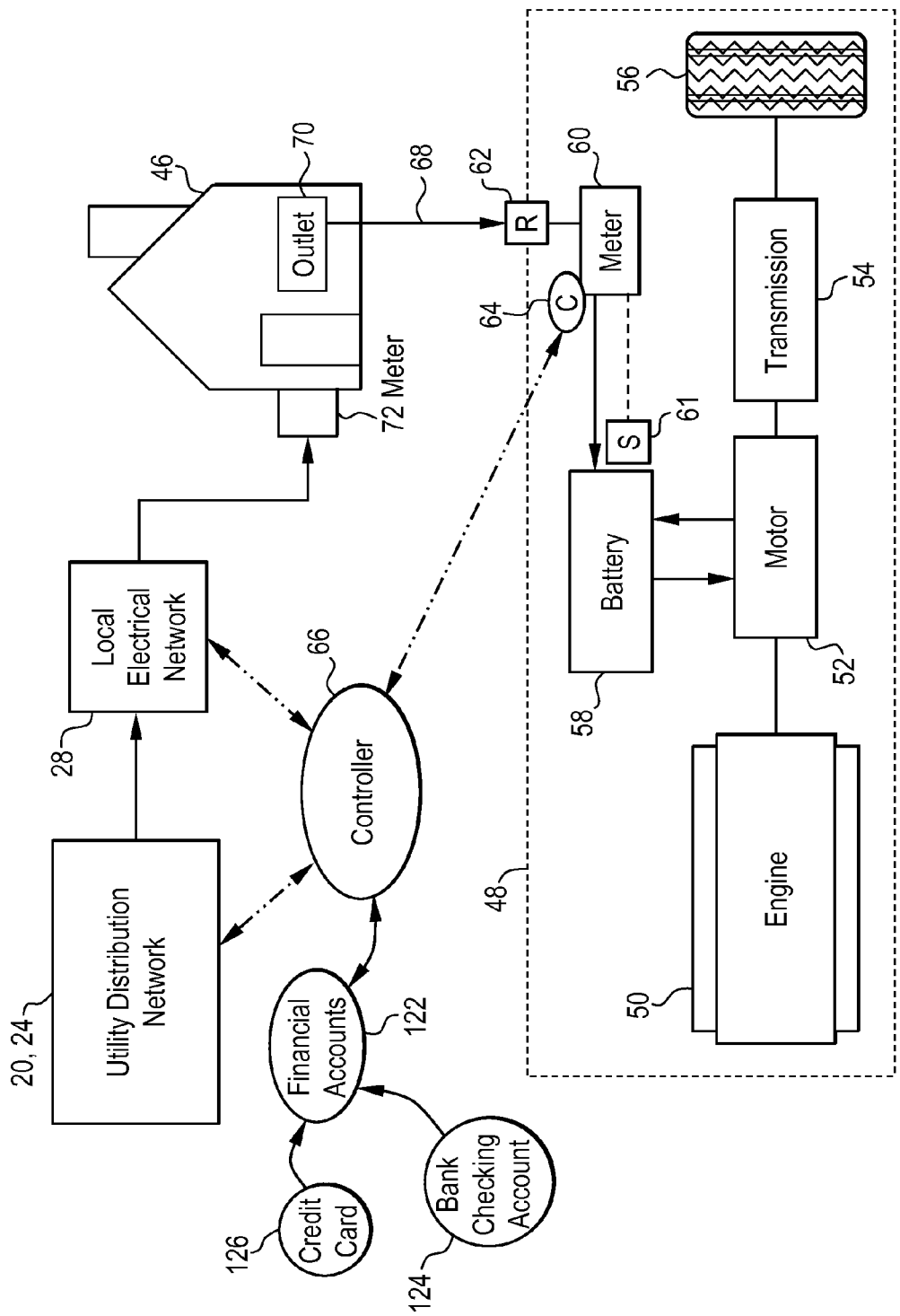
FIG. 3 is a schematic illustration of a PIH vehicle charging system in accordance with an exemplary embodiment.

Referring now to FIG. 3, an exemplary embodiment of a system for controlling the recharging of a PIH vehicle will be described. A PIH vehicle 48 typically includes an internal combustion engine 50 coupled to a motor 52 through a transmission 54 that transfers the power from the engine 50 and motor 52 to the wheels 56. A battery 58 is electrically coupled to provide electricity to power the motor 52. Alternatively, the motor 52 may be arranged to act as a generator driven by the engine 50 to provide recharging of the battery 58. It should be appreciated that the battery 58 is referred to as a single component, however, the battery 58 may be comprised of a number of electrochemical cells or discrete individual batteries that are coupled together in series or parallel, depending on the voltage and power needs. The battery 58 is electrically coupled to a receptacle 62 which provides an external connection to a power source. A meter 60 is electrically connected between the receptacle 62 and the battery 58 to control the flow of electrical power to and from the battery 58. A sensor 61 coupled to meter 60 is arranged to measure the charge remaining in the battery 58.

The meter 60 may be embodied in the form of computer-implemented processes and apparatuses for practicing those processes. The meter 60 may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes part of the meter 60. The meter 60 may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes part of the meter 60. When implemented on a general-purpose microprocessor, the computer program code segments configure the microprocessor to create specific logic circuits. As will be described in more detail below, one example of a technical effect of the executable instructions is to determine the level of charge in the batteries 58 and determine if the current time period corresponds with an approved recharge time period or reduced electricity cost based on the time of day or the intended use in a vehicle.

The meter 60 includes a communications device 64 that provides a means for the meter to communicate with external devices such as controller 66 as will be described in more detail herein. The communications device 64 may incorporate any type of communications protocol capable of allowing the meter 60 to receive, transmit and exchange information with one or more external devices. Communications device 64 may use communication systems, methodologies and protocols such as, but is not limited to, TCP/IP, IEEE 802.11, RS-232, RS-485, Modbus, IrDA, infrared, radio frequency, electromagnetic radiation, microwave, Bluetooth, powerline, telephone, local area networks, wide area networks, Ethernet, cellular, fiber-optics, barcode, and laser.

A cable 68 connects the receptacle 62 to an outlet 70 in residence 46. The cable 68 is appropriately sized to support the flow of electrical power between the PIH vehicle 48 and the residence 68. In the exemplary embodiment, the residential household circuit the cable will support 1.5 kilowatts at 110 volts to 3.0 kilowatts at 240 volts. The outlet 70 is connected to a residential meter 72 that connects the residence 46 to the local distribution network 28. The residential meter 72 measures the amount of electrical power supplied from the local distribution network 28 to the residence 46.

The meter 60 is disposed in communication with and to exchange data with controller 66. As will be described in more detail below, the controller 66 provides control functionality for organizing, scheduling and authorizing the recharging of PIH vehicle 48. In the exemplary embodiment, the controller 66 is described as being single computer processing device, however, it is contemplated that the controller 66 may also be a distributed or networked computing system comprised of a number of processing components. For example, each local distribution network 26, 28 may have an individual controller associated with providing the desired functionality to that network. These local distribution controllers may be in communication with each other, or with one or more "upstream" controllers within the utility system 20.

The controller 66 and the meter 60 may be any suitable control device capable of receiving multiple inputs and providing control functionality to multiple devices based on the inputs. Controller 66 and meter 60 includes a processor which is a suitable electronic device capable of accepting data and instructions, executing the instructions to process the data, and presenting the results. Processor may accept instructions through a user interface, or through other means such as but not limited to electronic data card, voice activation means, manually-operable selection and control means, radiated wavelength and electronic or electrical transfer. Therefore, the processor can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

Figure 4:
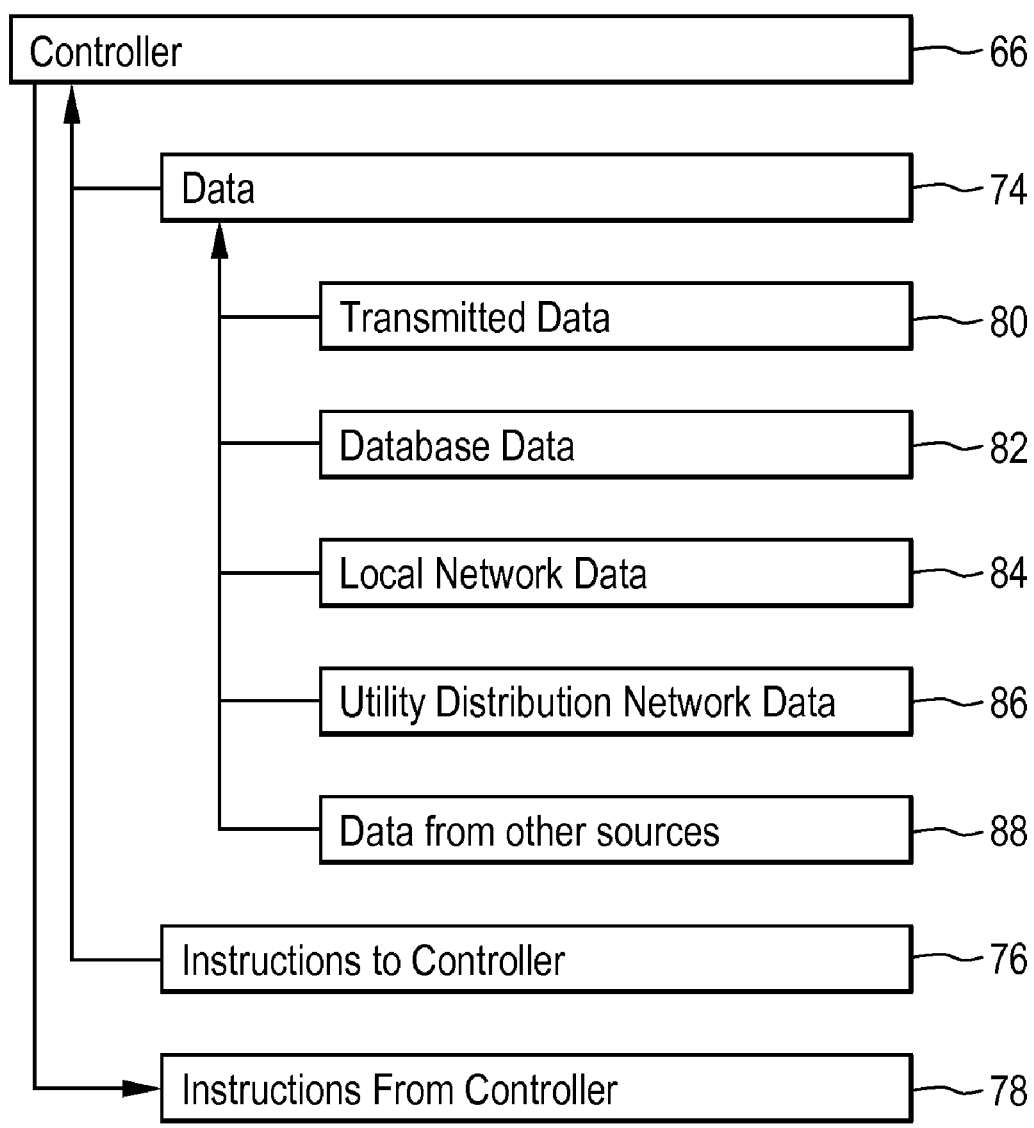
FIG. 4 is a representation of a controller which is disposed in communication with one or more PIH vehicles and the utility distribution network.

Referring now to FIG. 4, there is shown the controller 66 receiving as inputs data 74, and instructions 76. Controller 66 also outputs instructions 78. The data 74 may come from a variety of sources, such as transmitted data 80, database data 82, local distribution network data 84, main distribution network data 86, and other data 88. The data and instruction outputs from controller 66 may be transmitted to the PIH vehicle 48, the residential meter 70, a controller on another local distribution network, or a controller associated with the main distribution network 24.

Figure 5:
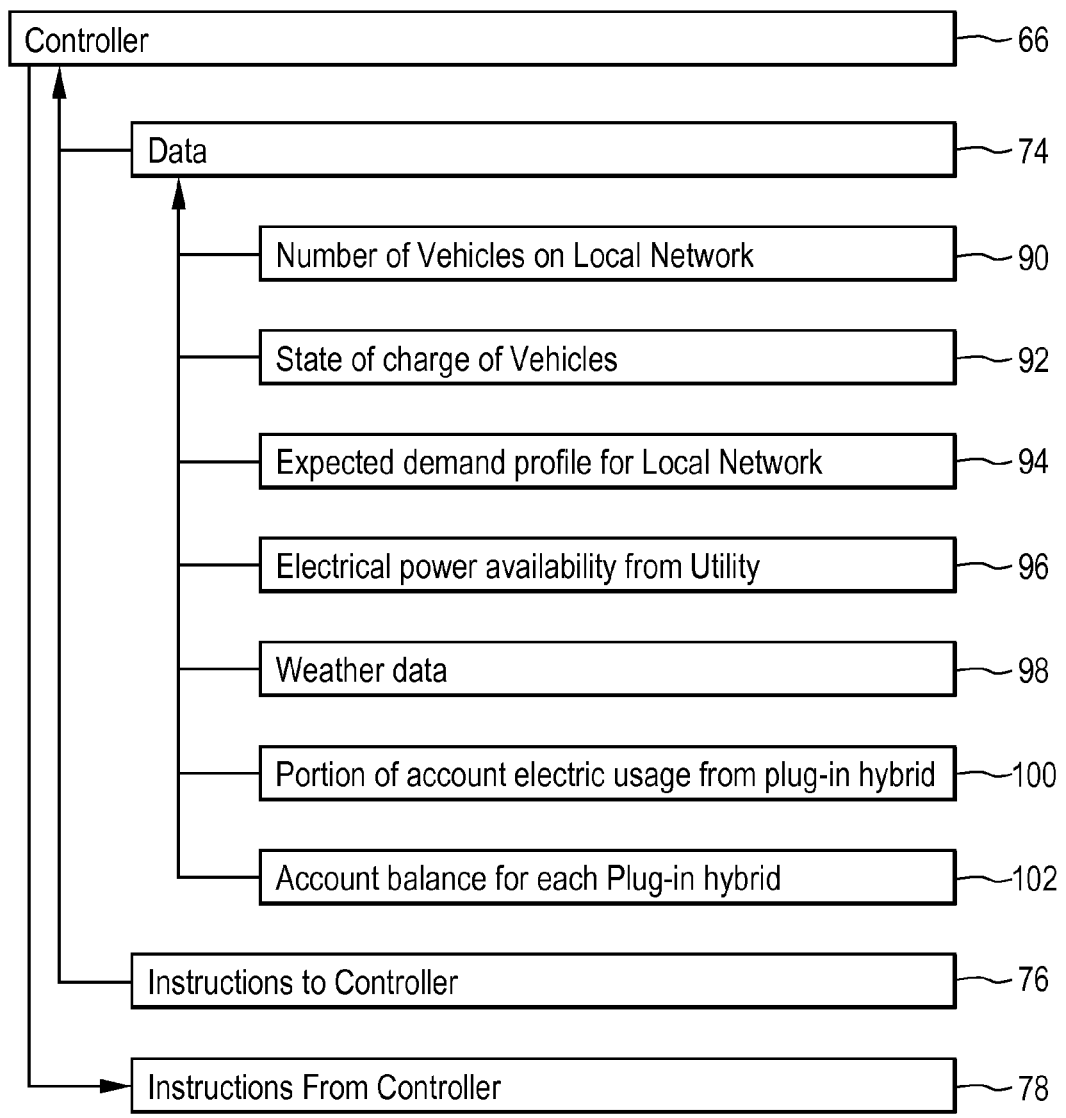
FIG. 5 is a representation of a controller which is disposed in communication with one or more PIH vehicles and a utility distribution network, the data sources in FIG. 5 are described in terms of the kind of information including, but not limited to the number of vehicles coupled to the network, the state of charge of the batteries in the vehicles, the demand profile of the network, electrical power availability, weather data, and account information.

Another embodiment of the controller 66 is shown in FIG. 5. The data 74 is described in terms of the type of information represented by the data, such as the number of vehicles on the local distribution network 90, the state of charge of each of the batteries in the vehicles 92, the expected demand profile for the local distribution network 94, the electrical power availability from the main distribution network 96, weather data 98, electrical power consumption by a PIH vehicle for a utility account 100, and a utility account information for the PIH vehicle 102. The utility account information will include the name, address, financial account information, and account holder preferences. Typically, the account information 101 will be associated with an individual or business entity. While the utility account information is described herein as having a single PIH vehicle associated therewith, it is contemplated that a single utility account may be associated with multiple PIH vehicles. Similar to the embodiment shown in FIG. 4, the data and instruction outputs from controller 66 may be transmitted to the PIH vehicle 48, the residential meter 70, a controller on another local distribution network, or a controller associated with the main distribution network.

Figure 6:
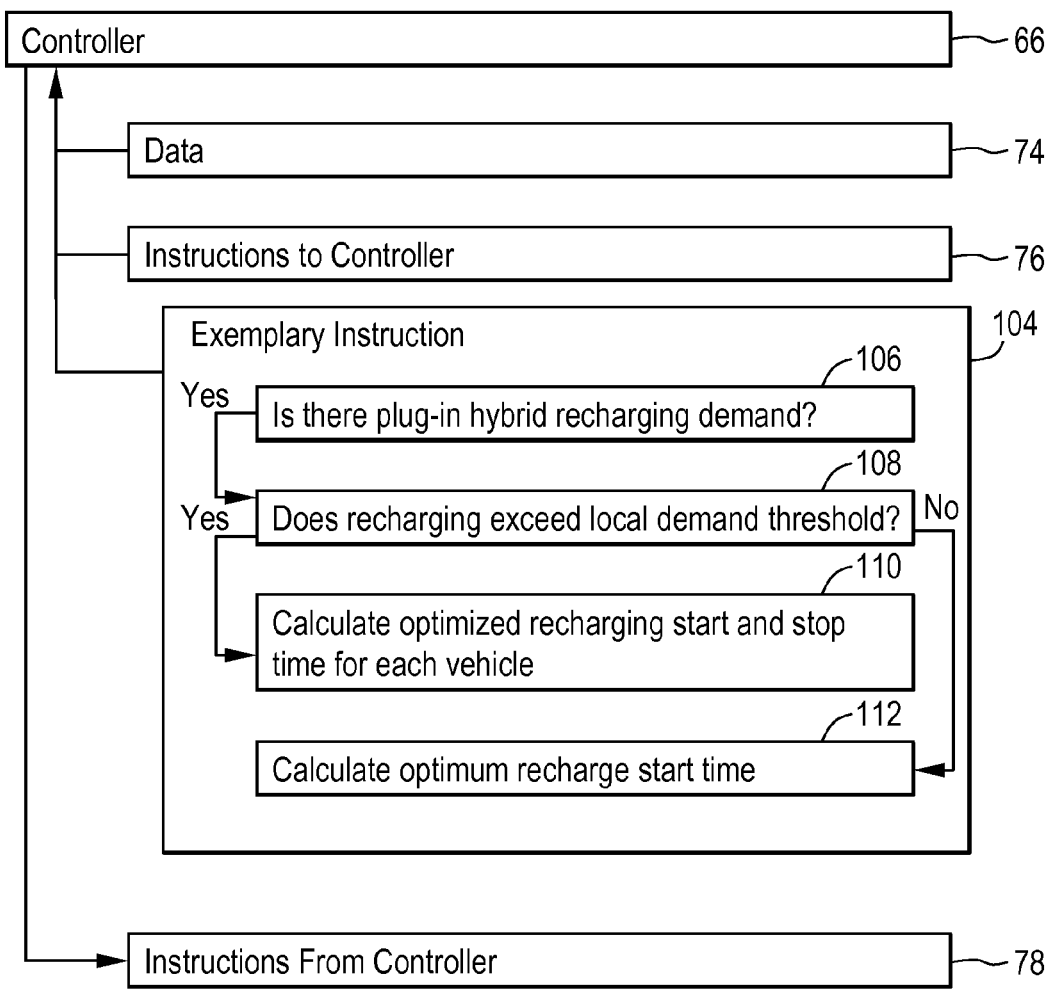
FIG. 6 is a representation of a controller which is disposed in communication with one or more PIH vehicles, a utility distribution network, and data sources, the controller of FIG. 6 is arranged to receive instructions, including but not limited to instructions on scheduling recharging time periods for vehicles coupled to the network.

Referring now to FIG. 6, another embodiment of the controller 66 is illustrated. The controller 66 receives inputs 74, instructions 76 and outputs instructions 78. The instructions 76 may include automated instructions that are executed on a processor associated with controller 66 and responsive to executable computer instructions. These instructions 76 may take the form of software, firmware, or any other form or combination of forms in which computer instructions may be embodied. The instructions 76 may or may not be subject to reprogramming or other change. An exemplary instruction 104 includes a process for scheduling the recharging of PIH vehicles on a local distribution network. First the controller 66 determines if there are any requests for PIH vehicle recharge 106. If there is a demand from PIH vehicles, it is determined if the aggregate recharging demand exceeds the local demand threshold 108. As discussed above, an individual local distribution network will have an electrical characteristic, such as the maximum power delivery for example. To maintain reliability, the utility will want to set a threshold, 70%-80% of the maximum power delivery capacity for example, in order to ensure that adequate power is available to meet the demands of the end users. To determine if the threshold will be exceeded by the demands placed on the local distribution network 28 by the PIH vehicles, controller may compare the PIH vehicle electrical demand against the expected electrical demand profile data 94 and the main distribution network availability data 96.

If the demand from the PIH vehicles is low enough, the controller may assign a simple recharge start and stop time 112 for the PIH vehicles during the off-peak period 114. If the demand from the PIH vehicles is sufficiently large, the controller 66 enters into instruction 110 where a schedule is formed by controller 66 for each PIH vehicle. The schedule is arranged to account for factors such as the expected electrical demand profile, the main distribution network power availability, the battery charge levels in each of the PIH vehicles, and charge rates for each of the PIH vehicles. The recharge schedule is arranged to stagger the start and stop times for each of the PIH vehicles on the local distribution network 28 to keep the total electrical power demand on the local distribution network 28 below the demand threshold and to maximize the efficient use of power plants 22. Once the controller 66 formulates the schedule, the respective recharge start and stop times are transmitted to each of the PIH vehicles on the local distribution network 28.

Figure 7:
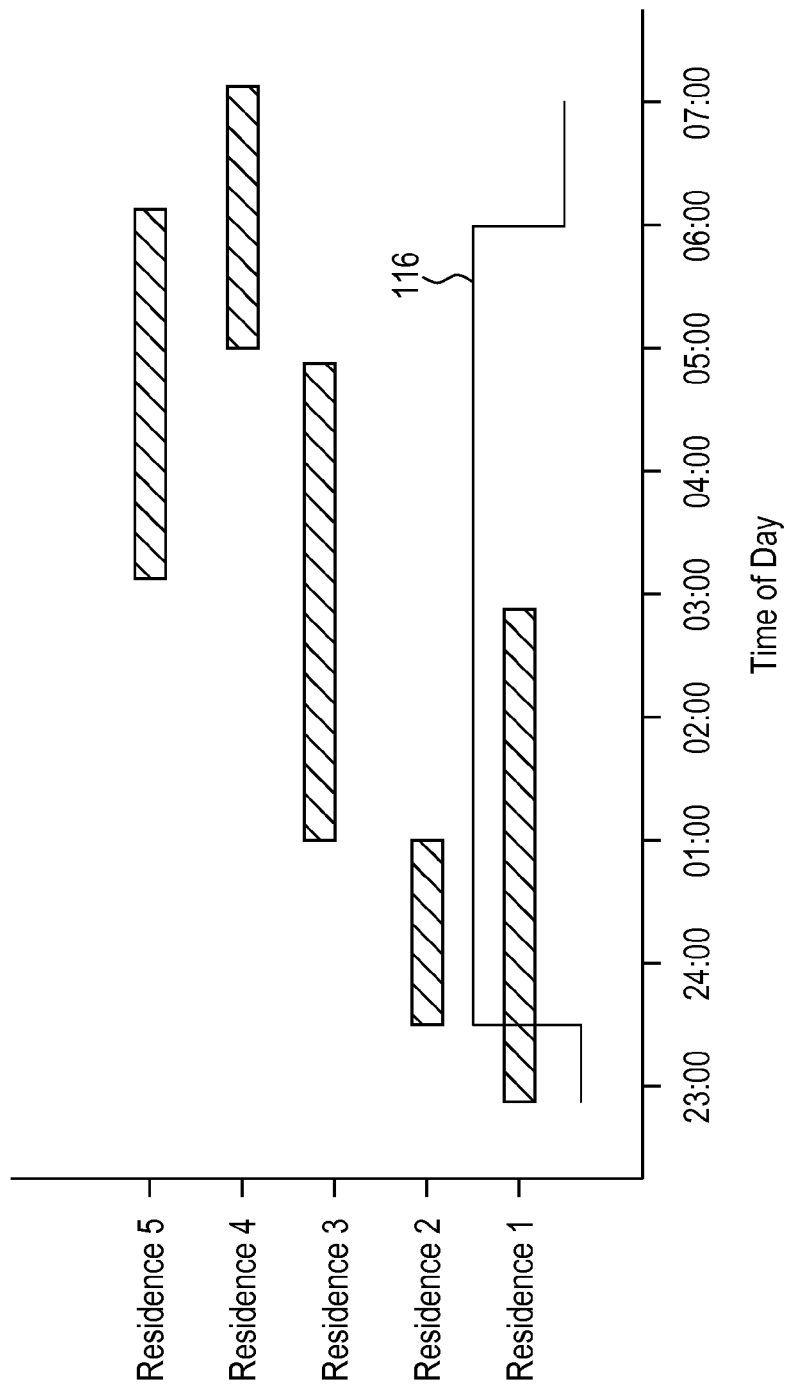
FIG. 7 is an example of a PIH vehicle recharging schedule where the increase in demand during an off peak time period remains relatively constant.

One example of a recharge schedule is illustrated in FIG. 7. Here, the controller 66 initiates the recharge schedule at 23:00 (11:00 PM). In this embodiment, the start and stop times for each of the PIH vehicles is arranged to maintain a constant electrical demand between 23:30 and 06:00 as illustrated by line 116. As shown in FIG. 7, the recharge times for each of the PIH vehicles is not the same and will depend on the state of charge of the batteries and the rate of charge that the batteries can maintain.

Figure 8:
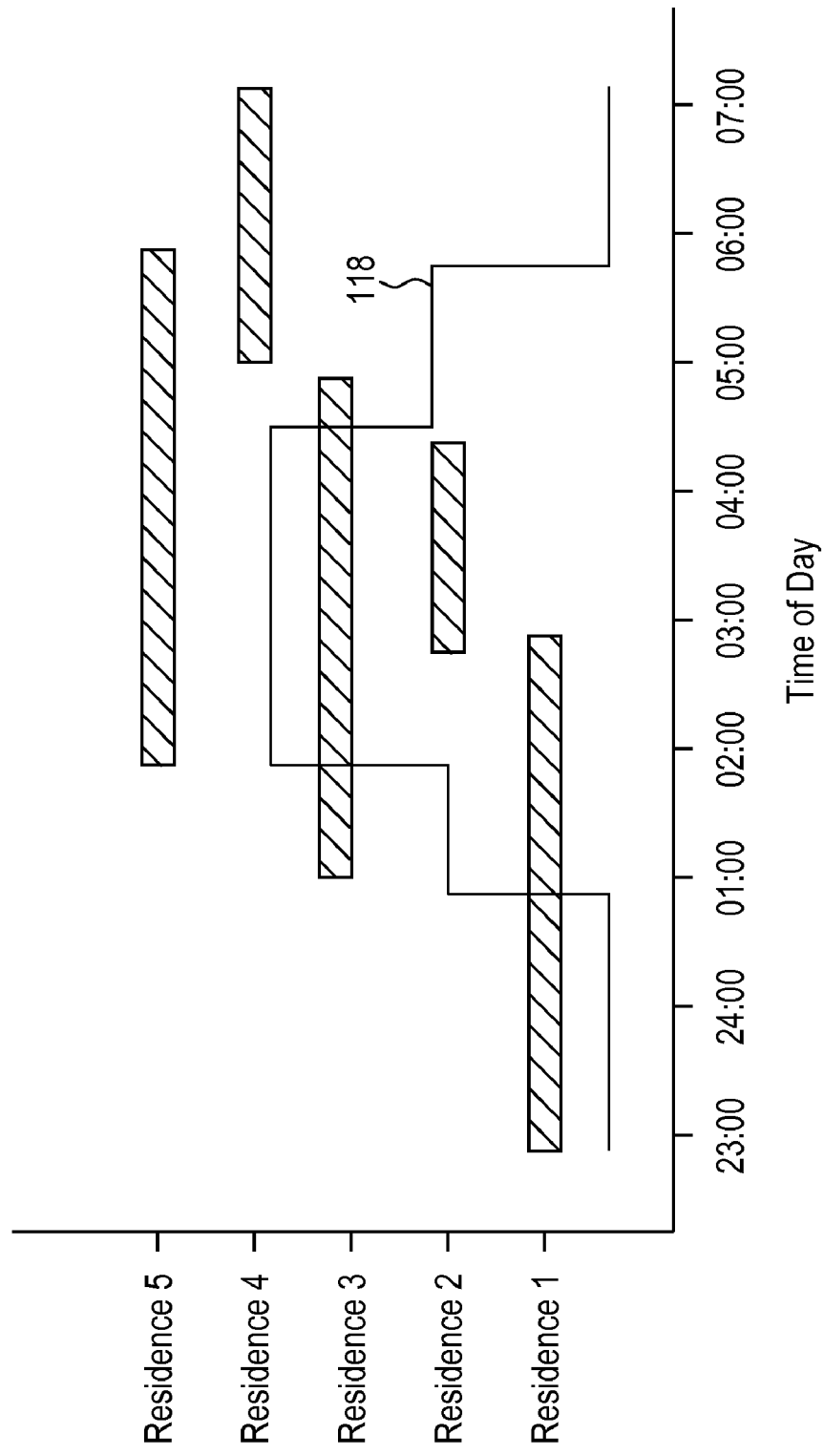
FIG. 8 is another example of a PIH vehicle recharging schedule where the demand from PIH vehicles is increased during time periods where the base electrical load is decreasing.

Another example of a recharge schedule is shown in FIG. 8. In this embodiment, the controller 66 bias the recharge times between 1:00 and 6:00 and especially between 2:00 and 4:00. This creates a PIH vehicle electrical demand as illustrated by line 118. The biasing of the PIH vehicle demand could be desired, for example, to offset the reduction in base demand from the end users to maintain a more constant total electrical demand from the local distribution network and make more efficient utilization of the power plants 22.

Figure 9:
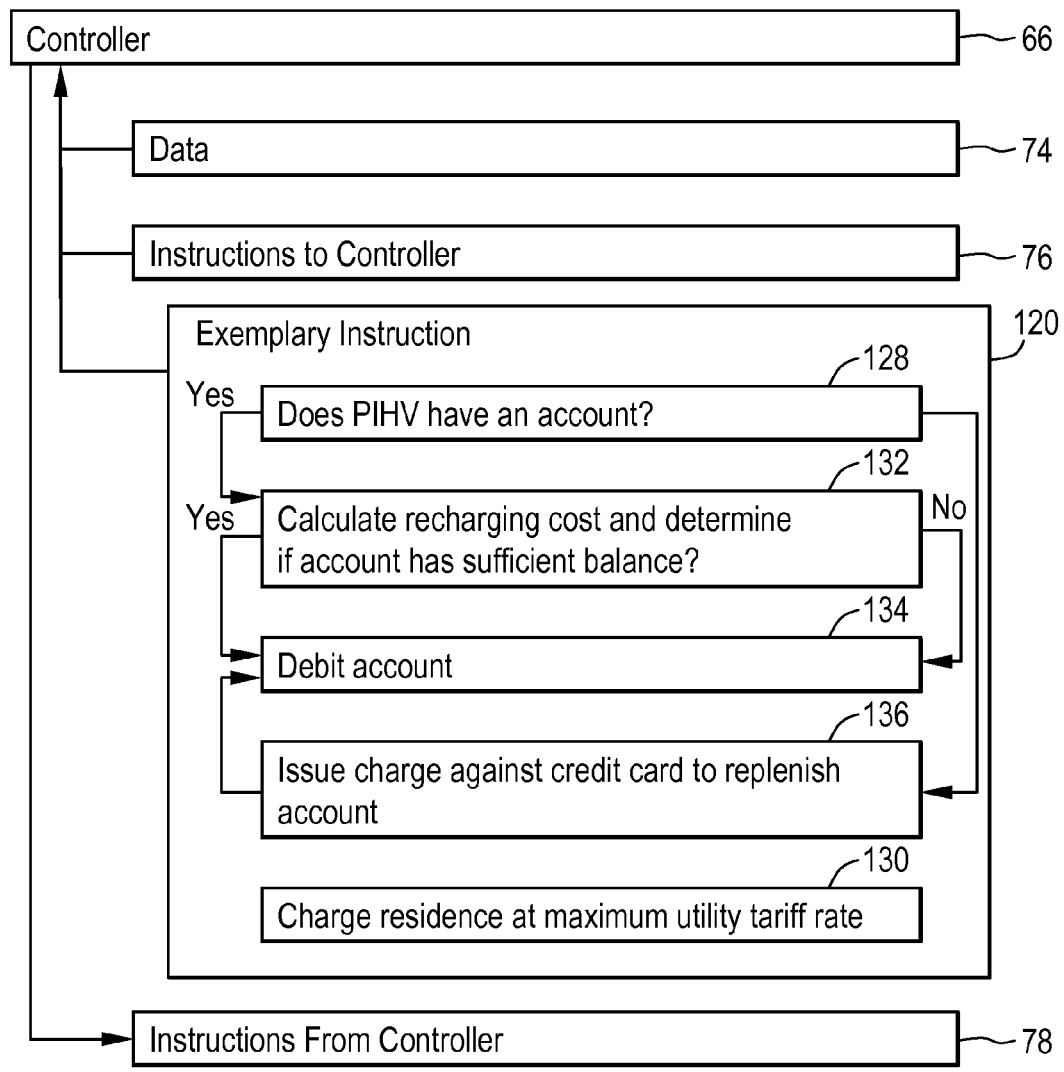
FIG. 9 is a representation of a controller which is disposed in communication with one or more PIH vehicles, a utility distribution network, and data sources, the controller of FIG. 9 is arranged to receive instructions, including but not limited to instructions on determining what tariff rate to charge a customer, and the automatic replenishing of the customers account.

The controller 66 may also include other instructions such as automated instructions that are executed on a processor associated with controller 66 and responsive to executable computer instructions. Another exemplary embodiment instruction 120 that includes a method for collecting fees as illustrated in FIG. 9. As will be discussed below in more detail, after receiving data 90 that a PIH vehicle is connected to the local distribution network 28, controller 66 determines if the PIH vehicle has an account with the utility 128. In the exemplary embodiment, the PIH vehicle accounts maintained by the utility are "pre-paid" where funds are placed in the account prior to the account holder consuming electricity. The controller 66 may be connected to one or more pre-authorized financial accounts 122 such as bank checking account 124 or credit card account 126 (FIG. 3). This connection would allow controller 66 to further execute instructions that result in the transfer of funds to replenish the utility account.

A utility account may be desirous to both the utility and the account holder. In exchange for the pre-paid account and the ability to schedule the recharging times, the utility may extend a lower tariff rate to the account holder thus reducing the cost of operating the PIH vehicle. Alternatively, the account holder may desire to purchase the electrical power from a particular source, such as a renewable energy source such from a solar or wind generation system. In the exemplary embodiment instruction 120, if the PIH vehicle does not have an account, the controller 66 changes the tariff rate for the PIH vehicle electricity consumption to a second rate 130. In the exemplary embodiment, the second rate 130 is higher than the tariff charged to an account holder. If a utility account does exist, controller 66 determines if the account has sufficient funds 132 to recharge the PIH vehicle based on data 92 regarding the level of charge in the batteries. When sufficient funds are available, the utility account is debited 134 for the cost of the recharge and the vehicle is scheduled for a recharging period as discussed above. In circumstances where there are insufficient funds, the controller may initiate a transfer 136 from the preauthorized financial accounts 122 as discussed above.

Figure 10:
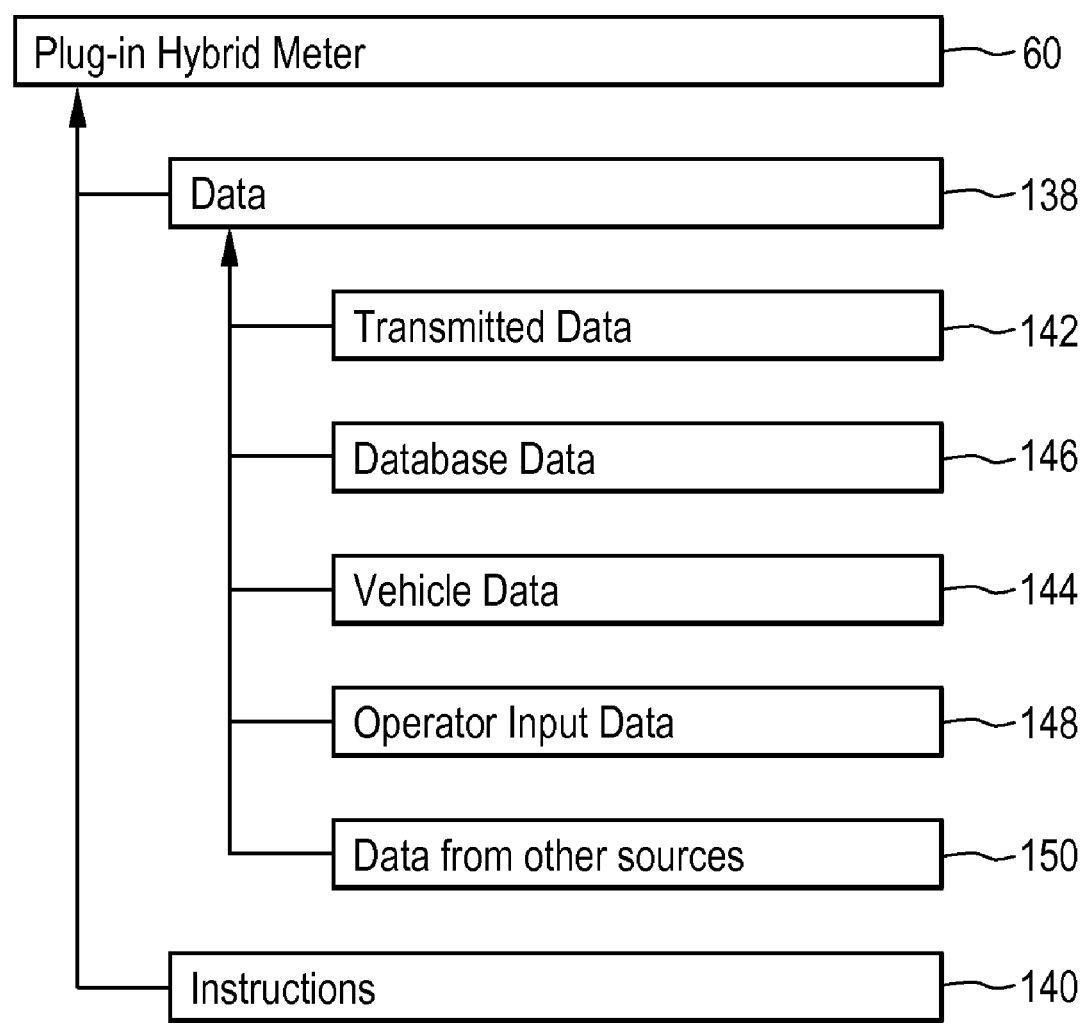
FIG. 10 is a representation of a PIH vehicle meter which is coupled to a PIH vehicle and disposed in communication with the controller of FIG. 4 and the utility electrical distribution network.

Referring now to FIG. 10, there is shown the meter 60 receiving as inputs data 138, and instructions 140. The data 138 may come from a variety of sources, such as transmitted data 142, database data 146, vehicle data 144, operator input data 148, and other data 150. The data and instruction outputs from meter 60 may be transmitted to controller 66, the residential meter 70, or a controller associated with the main distribution network.

Figure 11:
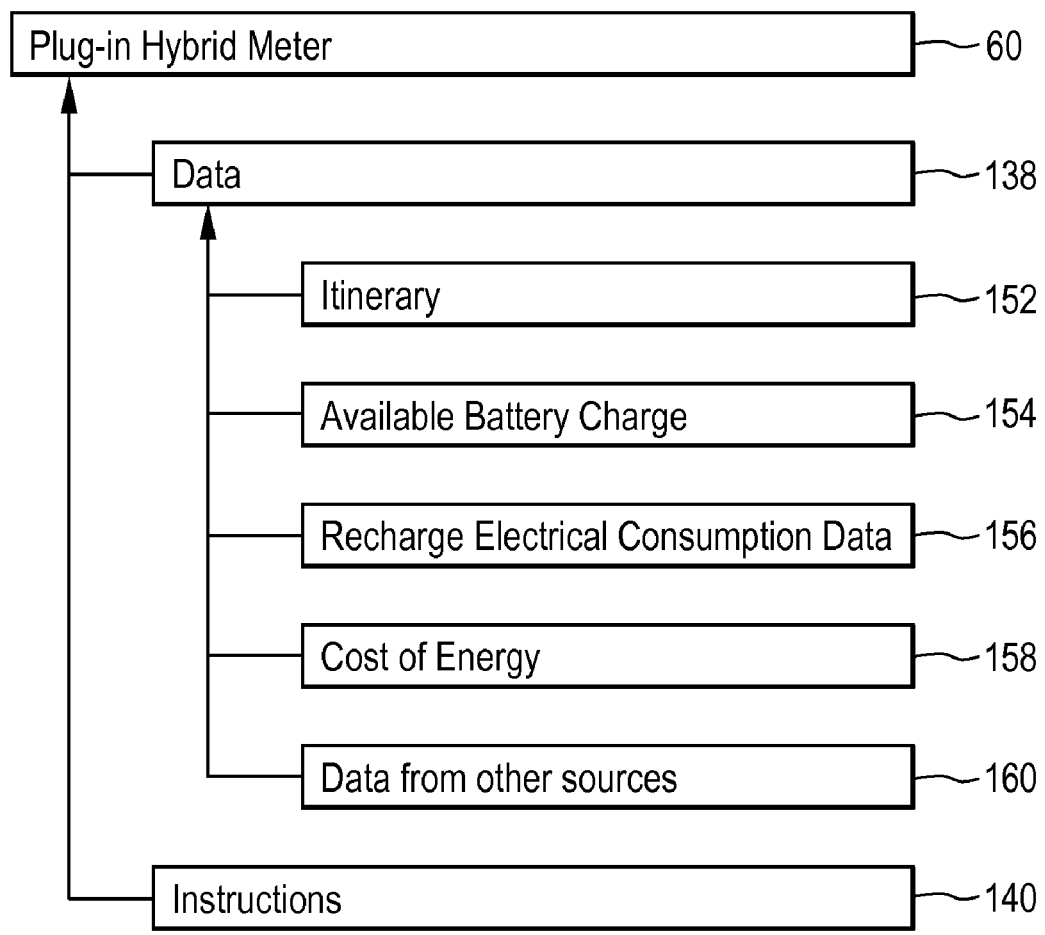
FIG. 11 is a representation of a PIH vehicle meter which is disposed in communication with the controller of FIG. 4 and a utility electrical distribution network, the data sources in FIG. 11 are described in terms of the kind of information including, but not limited to the vehicle itinerary, available battery charge, recharge electricity usage data, and cost of energy.

Another embodiment of the meter 60 is shown in FIG. 11. The data 138 is described in terms of the type of information represented by the data, such as the expected itinerary of the vehicle 152, the state of charge of each of the batteries 154, the recharge electrical consumption data 156, the cost of electrical energy 158, and data from other sources 160. Similar to the embodiment shown in FIG. 10, the data and instruction outputs from controller 66 may be transmitted to the controller 66, the residential meter 70, or a controller associated with the main distribution network. This data may be used advantageously to help in the cost effective and efficient scheduling of the recharge of the PIH vehicle. For example, data on the itinerary of the vehicle for the following day, along with the state of charge of the batteries, may allow the controller 66 to skip the recharging period of the PIH vehicle if the vehicle has sufficient charge remaining for the travel expected the next day. This would provide further options to assist the controller 66 in balancing the demand from the local distribution networks 26, 28 and the power available from the main distribution network 24.

In another embodiment, the recharging schedule includes recharging periods during other parts of the day. For example, an end user on the residential local distribution network 28 leaves their house in the morning and travels in the PIH vehicle to a place of work that includes a charging station. After plugging the PIH vehicle into the commercial local distribution network 26, the meter 60 communicates information, such as account information, state of charge for example, with the controller 66. The controller 66 may then schedule a recharging period for the PIH vehicle during the day if there is available electrical power. The ability to dispatch and include additional loads created by PIH vehicles would allow the utility to further increase their efficiency of their operations by better utilizing power plants 22 or talking advantage of lower cost electrical power from other distribution systems as it becomes available.

Figure 12:
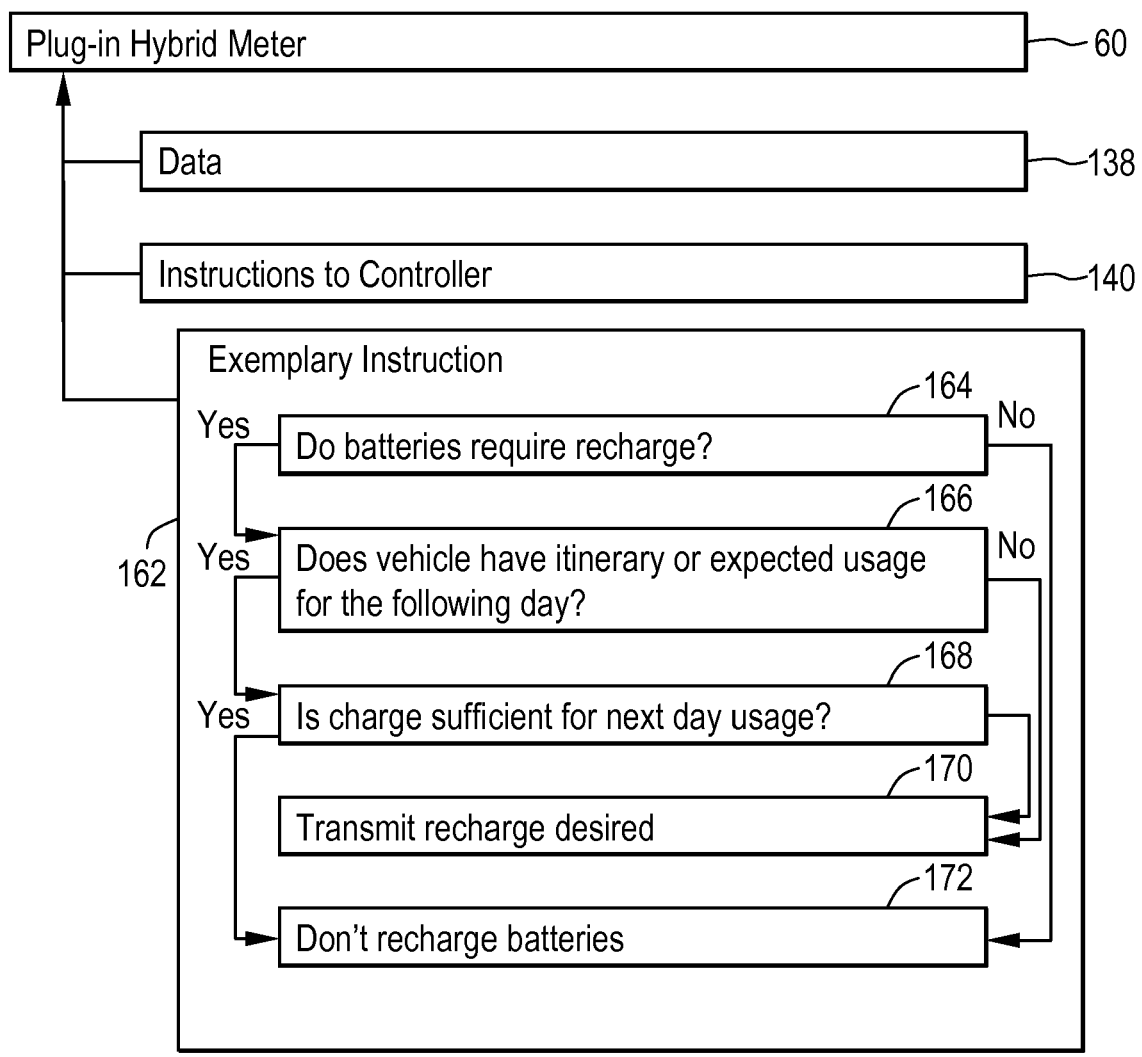
FIG. 12 is a representation of a PIH vehicle meter which is disposed in communication with the controller of FIG. 4, a utility electrical distribution network, and data sources, the meter of FIG. 12 is arranged to receive instructions, including but not limited to instructions on determining whether or not a PIH vehicles batteries need to be recharged, or whether the recharging can be delayed.

Referring now to FIG. 12, another embodiment of the meter 60 is illustrated. The meter 60 receives data 138, and instructions 140. The instructions 140 may include automated instructions that are executed on a processor associated with meter 60 and responsive to executable computer instructions. These instructions 140 may take the form of software, firmware, or any other form or combination of forms in which computer instructions may be embodied. The instructions 140 may or may not be subject to reprogramming or other change. An exemplary instruction 162 includes a process for scheduling the recharging of the PIH vehicle based on an itinerary data 152. First the meter 60 determines if the batteries 58 require recharge 164. If a recharge is desired, the vehicle's itinerary is interrogated 166 to determine if there is sufficient charge 168 to meet the needs of the vehicle owner. If the PIH vehicle does not have itinerary data 152 or if the charge is insufficient, the meter 60 transmits data 170 to the controller 66 indicating a desire to be placed on the recharging schedule. If the batteries are not in need of recharge, or if the itinerary data 152 indicates that the charge is sufficient, the meter 60 either indicates no recharge is needed 172 to controller 66. Allowing a PIH vehicle operator to determine whether or not to recharge based on an itinerary may provide advantages to the account holder. For example, if the utility has different tariff rates for different days, weekdays versus weekends for example, by programming the meter 60 to skip a day if cost of energy data 158 indicates that the electricity will be less expensive on an alternate day.

It should be appreciated that the meter 60 while discussed herein in terms of its processor functionality may also include a number of components. It is contemplated that the meter may, in addition, include hardware elements such as, but not limited to a current transformer, an induction meter, a power supply, a metering engine such as an digital signal processor, and the like.

Further, in another alternate embodiment, the meter 60 is arranged to allow the flow of electrical power from the batteries 58 into the residence 46. In this embodiment, where an unexpectedly high demand is experienced on the local distribution network 28, the controller 66 may instruct the meter 60 to reverse the flow of electrical power from the batteries 58 back to the residence 46 in order to offset the power usage in the residence 46. The cabling installed in most residential buildings will typically allow a maximum transfer of 1 kilowatt to 2 kilowatts of electrical power. While this may not be sufficient to meet all the electrical needs of the residence 46, this could provide an additional advantage to the utility in allowing the balancing of loads and supply to meet the needs of the local distribution network 28.

Figure 13:
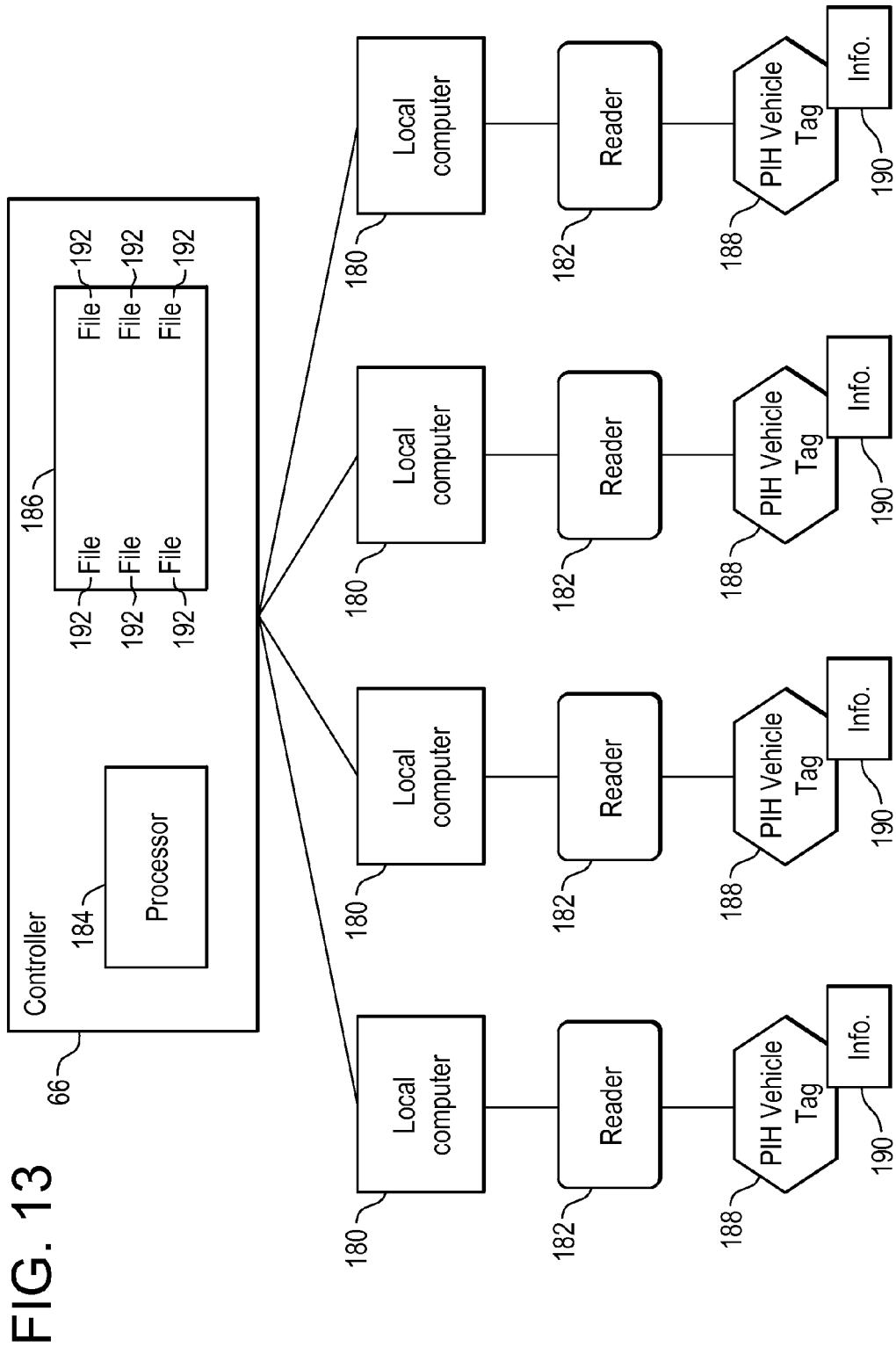
FIG. 13 is a schematic representation of an alternate embodiment for collecting fees associated with recharging a PIH vehicle.

As discussed above, the utility account may be desirous to both the utility and the account holder. In exchange for the pre-paid account and the ability to schedule the recharging times, the utility may extend a lower tariff rate to the account holder thus reducing the cost of operating the PIH vehicle. Referring to FIG. 13, an alternate embodiment collection system is illustrated. Given the mobility of modern society, it is likely that PIH vehicle users may want to recharge the vehicles batteries at more than one location. For example, the end user may wish have the batteries charged while they are working or otherwise traveling. Therefore it would be advantageous to have a system that facilitates the collection of fees in a manner that provides benefits to both the utility and the end user.

In this embodiment, the controller 66 is coupled with one or more remote computers 180 and a plurality of readers 182 associated with the remote computers 180. The remote computers could be another controller on a different utility system, a controller on another main distribution system, a controller on a local distribution network or a computer associated with a "recharging lot." The recharging lot could be either a commercial operation conveniently located close to businesses or shopping centers, or alternatively could be a location provided by the utility or the local government to encourage the use of PIH vehicles. The controller 66 in this embodiment includes a processor 184 capable of a programmed response and to execute computer instructions. The controller 66 may also have a storage unit 186 that may comprise a magnetic, solid state, optical, or other storage media for storing applications, data, operating systems and other information. It should be appreciated that the controller 66 may also be connected to other processing systems, such as financial accounts 122, credit card accounts 126 and bank checking accounts 124 for example, to facilitate the exchange of funds to replenish an account as described above.

Each subscribing user will have a unique account associated with the PIH vehicle. To facilitate the operation of the recharging system, identification data is located in the PIH vehicle 48. This information may be embedded as data in the meter 60, or alternatively be located in a "tag" 188. The information data 190 embedded in the tag 188 may include information on the utility account, which utility the account is held, maximum acceptable energy costs, recharge rates and the like. The tag 188 may transmit the identification data 190 using any means capable of interaction with the reader 182, including but not limited to radio-frequency, infrared or bar code. Once the reader 182 detects the tag 188, when the PIH vehicle is pulled into a recharging space in a parking lot for example, the information data 190 is transmitted by the local computer 180 to the controller 66 for validation. The transmission of information data 190 may be accomplished by any suitable means, including but not limited to local area networks, wide area networks, satellite networks, Ethernet, or the Internet.

When the information data 190 is transmitted to controller 66, the controller 66 searches through files 192 created by processor 184 for each subscribing utility account and stored on storage unit 186. The files may contain such information as, but not limited to, an individual account holders name, address, tag information, prefunded account information, and account holder energy cost preferences. The files 192 may also include information that may be used to replenish the prefunded utility account balance. Once the controller 66 determines that the PIH vehicle has a valid account, data is transmitted to local computer 180 authorizing the recharging along with any parameters that may affect the length, amount or cost of the recharge. In the embodiment where the recharging occurs in a commercial recharging lot, the data may also include information on how funds will be exchanged between the commercial lot and the utility. Where the recharge is to be for a fixed amount, the controller 66 debits the utility account for the appropriate amount. Where the amount to be charged is unknown at the time of the initial data exchange, the local computer 180 communicates with the controller 66 once the charge is completed with cost information for the recharge.

The use of PIH vehicles is expected to reduce the overall amount of carbon emissions from the driving of personal vehicles since the emissions associated with generating electricity are lower than the cumulative emissions from fossil fuel based automobiles. One method of tracking emissions is called a "carbon credit." Under international treaties, such as the Kyoto Protocol, carbon emission quotas are imposed on countries to place a cap on emissions. Each nation in turn places quotas on industries within their country. A carbon credit is a tradable commodity that is created through "green" or low emission activities. Through the use of carbon credits, a high emission operator may offset their emissions by purchasing credits from the producers of the carbon credits. It should be appreciated that while the embodiments discussed herein have referred to "fund" transfers, these transfers may also be in the form of a carbon credit. Further, due to the increased electrical demand from PIH vehicles, utilities may have increased emissions even though the over all combined emission levels are lower. It is contemplated that the utilities would be provided carbon credits or some other offset associated with providing of electrical power to PIH vehicles.

It should be appreciated that a system of authorized utility accounts may be advantageous to governmental tax authorities as well. As the availability and proliferation of PIH vehicles expands, the tax base of what is known as "road use taxes" will decrease as well. Road use taxes are generated from the sale of fuel, such as gasoline for example, and used by governmental authorities to build and maintain the system of roadways used by society. By using less fuel the PIH vehicle owner will continue to use the roadways while paying less in taxes for that use. While this may be desirous by the individual, in the long term this could be detrimental for society. By maintaining the utility accounts that segregate electrical consumption by PIH vehicle from that of the normal residential electrical loads. While a new road-use tax could be imposed on the electricity consumed by the end users, this could unfairly penalize those utility customers who own conventional combustion engine vehicles. These end users would end up paying for road taxes twice, once on their gasoline purchase and then again with their electricity consumption. By implementation of the utility accounts and the segregating PIH consumption from the other residential loads, the governmental tax authority is provided with an appropriate means for collecting road use taxes without penalizing other residences that do not have a PIH vehicle This written description uses examples to disclose the invention, including the best mode, and also to enable any person skilled in the art to practice the invention, including malting and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for recharging a plurality of hybrid vehicles connected to a local utility network having a plurality of distribution equipment thereon, said method comprising:
   determining a number of hybrid vehicles positioned in geographically distinct locations and connected to said local utility network;
   determining an electrical power capacity characteristic of said plurality of distribution equipment to deliver electrical power;
   determining an off-peak period based on an electrical demand profile for said local utility network;
   scheduling recharge times for each of said plurality of hybrid vehicles, wherein said scheduling is based on a balancing of said electrical power capacity characteristic, said demand profile and said number of said hybrid vehicles; and,
   activating recharging of each of said hybrid vehicles at predetermined times during said off-peak period.

2. The method for recharging a plurality of hybrid vehicles of claim 1 further comprising:
   determining availability of electric power to said local utility network; and,
   scheduling said recharge times of said hybrid vehicles to maximize the number of said vehicles being recharged without exceeding a maximum power delivery threshold of said local utility network.

3. The method for recharging a plurality of hybrid vehicles of claim 2 further comprising:
   determining a base electrical demand for said electrical loads on said local utility network; and,
   determining a hybrid vehicle demand for said plurality of hybrid vehicles on said local utility network.

4. The method for recharging a plurality of hybrid vehicles of claim 3 further comprising:
   deactivating said recharging of one or more hybrid vehicles if a combination of said base electrical demand and said hybrid vehicle demand exceeds said maximum power delivery threshold of said local utility network.

5. The method for recharging a plurality of hybrid vehicles of claim 4 further comprising:
   deactivating said recharging of one of said one or more hybrid vehicles if said one hybrid vehicle has insufficient funds in a utility account to pay for the cost of recharging.

\* \* \* \* \*